Aug. 14, 1962
F. J. LUKETA
3,048,936
V-DOOR FOR TRAWLING AND BRIDLE THEREFOR
Filed June 29, 1961
5 Sheets-Sheet 1
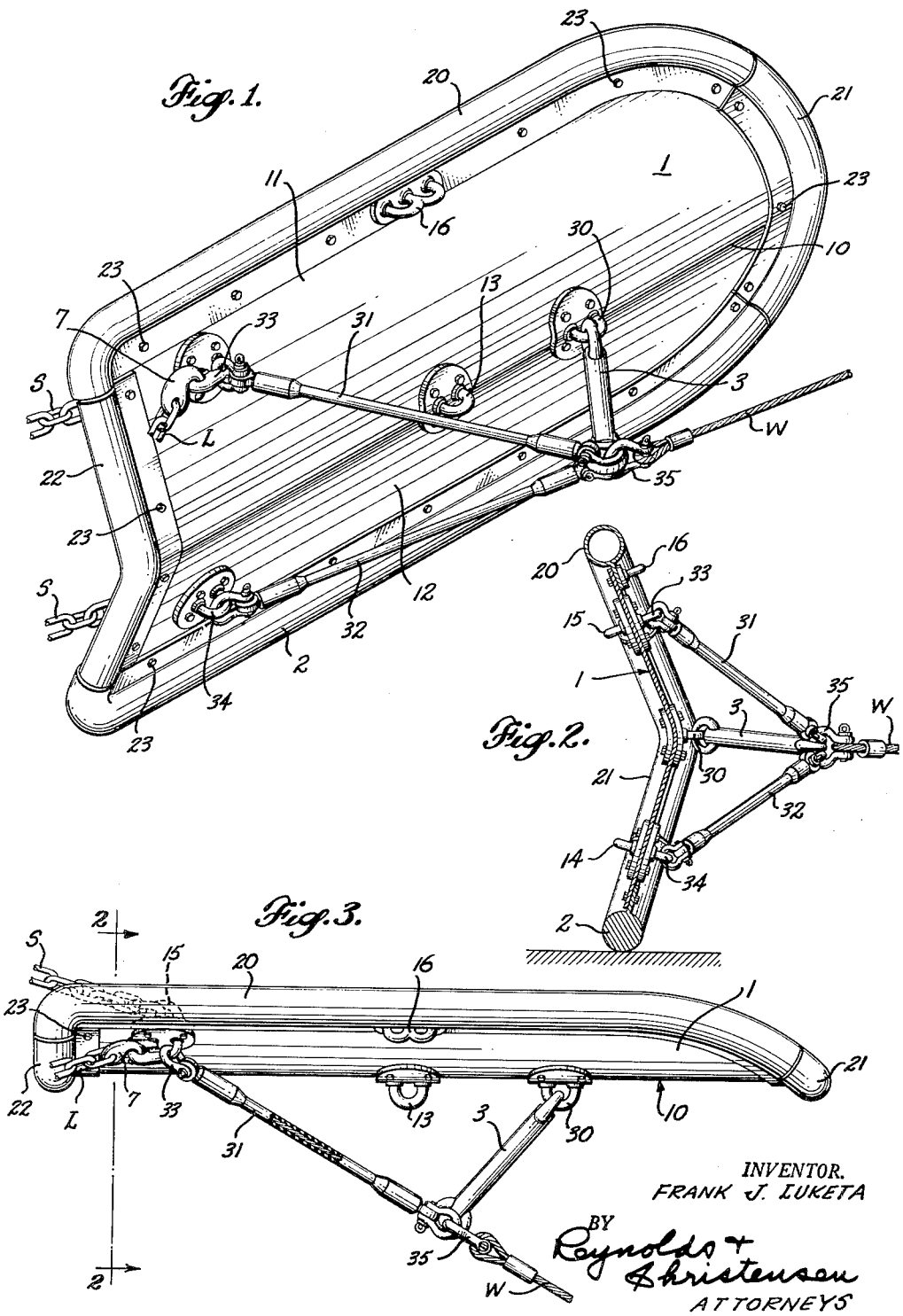
INVENTOR.
FRANK J. LUKETA
BY Reynolds + Christensen
ATTORNEYS

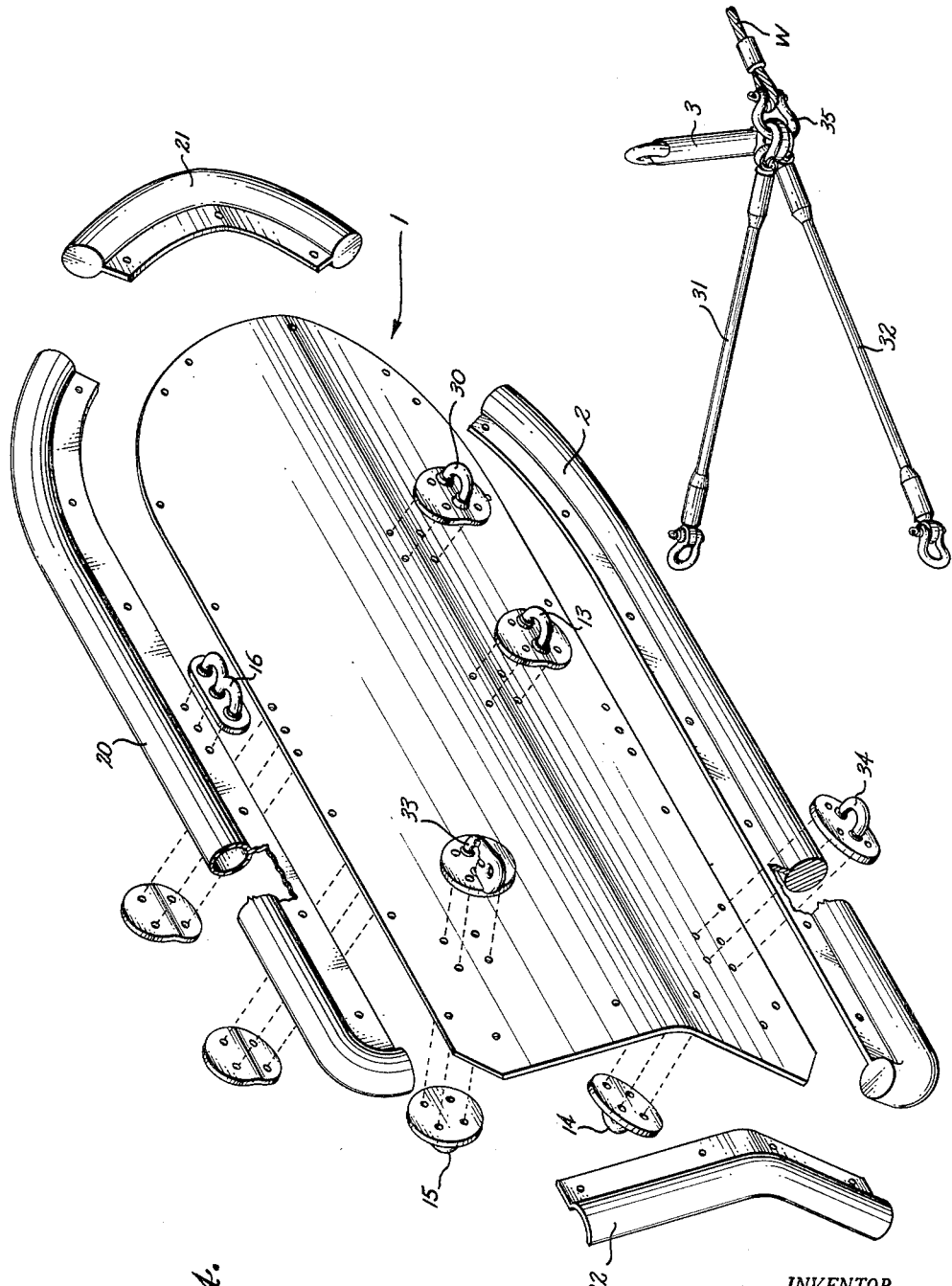

Aug. 14, 1962  F. J. LUKETA  3,048,936
V-DOOR FOR TRAWLING AND BRIDLE THEREFOR
Filed June 29, 1961  5 Sheets-Sheet 3
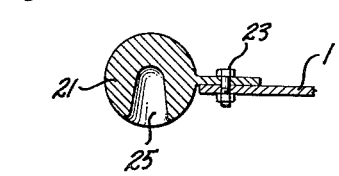
Fig. 6.
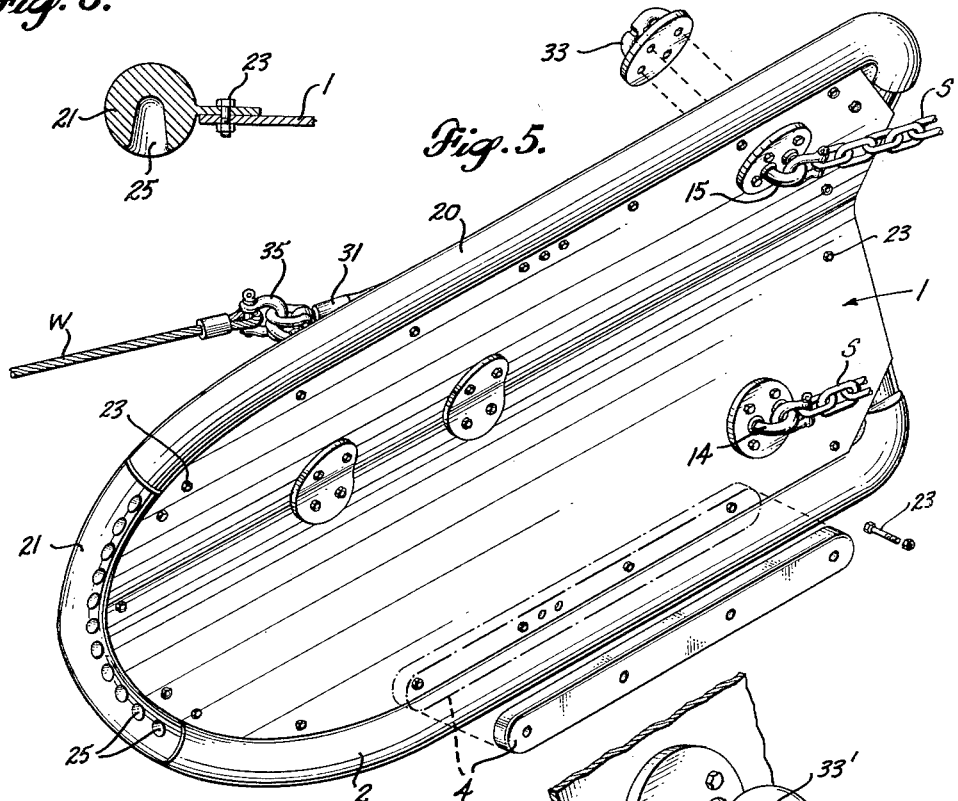
Fig. 5.
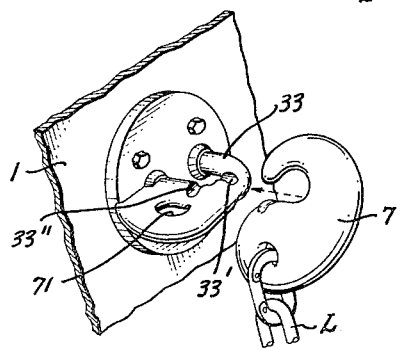
Fig. 7.
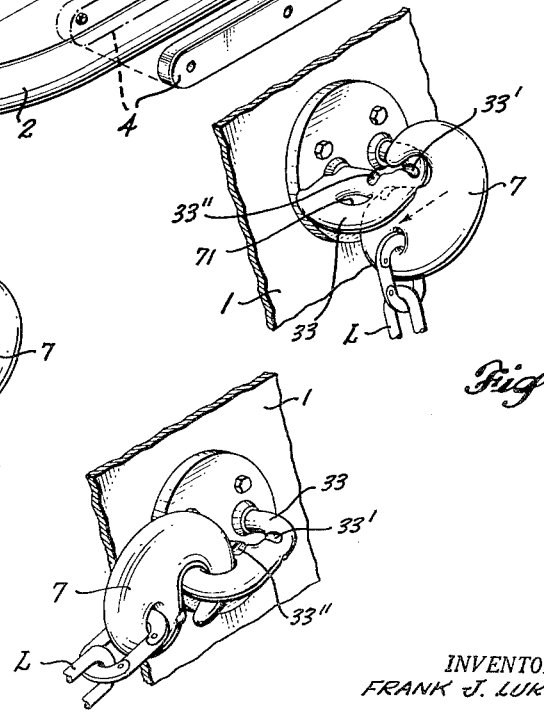
Fig. 8.
Fig. 9.
INVENTOR.
FRANK J. LUKETA
BY
Reynolds & Christensen
ATTORNEYS Aug. 14, 1962     F. J. LUKETA     3,048,936
V-DOOR FOR TRAWLING AND BRIDLE THEREFOR
Filed June 29, 1961     5 Sheets-Sheet 4
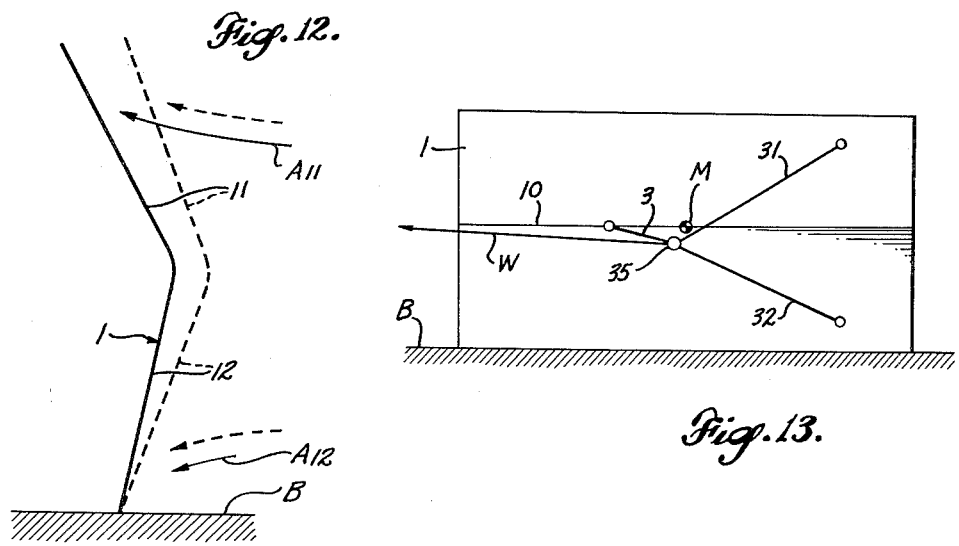
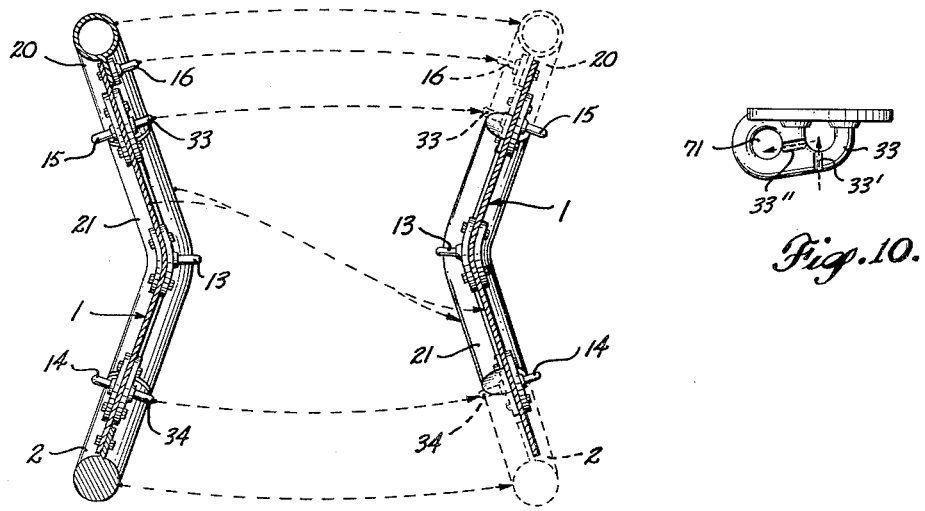
INVENTOR.
FRANK J. LUKETA
BY
Reynolds & Christensen
ATTORNEYS Aug. 14, 1962
F. J. LUKETA
3,048,936
V-DOOR FOR TRAWLING AND BRIDLE THEREFOR
Filed June 29, 1961
5 Sheets-Sheet 5
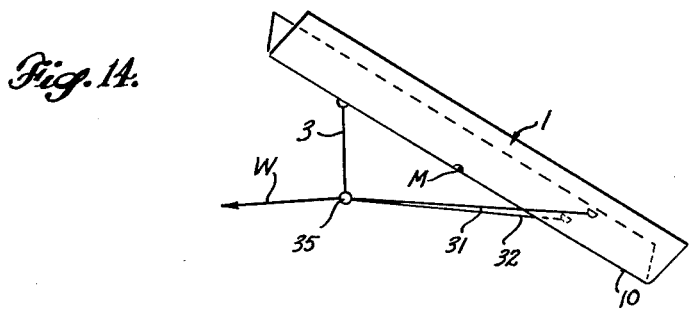
Fig. 14.
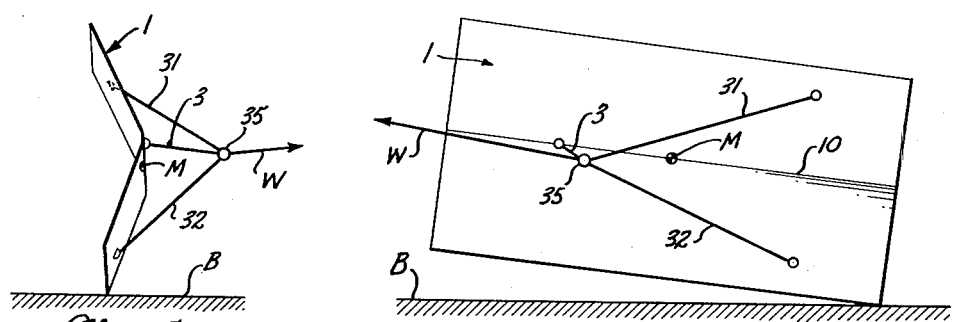
Fig. 15.
Fig. 16.
Fig. 17.
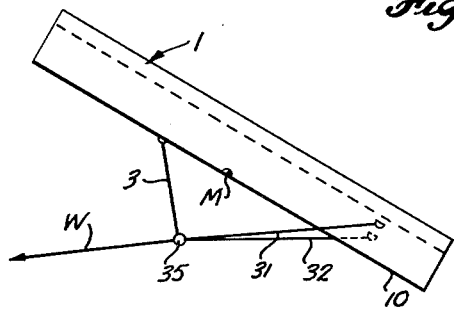
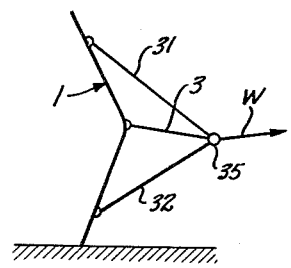
Fig. 18.
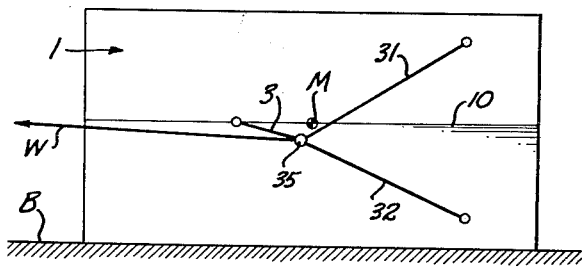
Fig. 19.
INVENTOR.
FRANK J. LUKETA
BY
Reynolds & Christensen
ATTORNEYS

United States Patent Office 3,048,936
Patented Aug. 14, 1962

3,048,936
V-DOOR FOR TRAWLING AND BRIDLE
THEREFOR
Frank J. Luketa, 5567 Greenwood Ave., Seattle, Wash.
Filed June 29, 1961, Ser. No. 120,549
16 Claims. (Cl. 43—9)

This invention concerns a door, used in trawling, attached at the forward end of sweep lines or the like that extend rearwardly to the trawl net, and to which door a towing warp is secured, extending upwardly and forwardly to the trawler. Two such doors are used with each net, their function being to spread widely the opposite curtains or wings that precede the net body and lead fish to the entrance to the net body, and thereby to sweep the greatest feasible width with the greatest economy of power. Such doors of one kind or another are used in midwater trawling as well as in bottom trawling, but the door of this invention is primarily intended for use in bottom trawling.

A principal object of this invention is to impart stability of position and direction to the door, during the setting out or shooting of the trawling gear, and during the actual trawling operation while the door drags over the bottom, and to maintain positive and stable contact of the door, and its entire lower edge in particular, with the bottom, so that its bottom edge is not cocked upwardly to ride on its after end, nor downwardly to nose into the bottom at its forward end. This is accomplished by means of the shape of the door and the positional relationship of certain bridle components and of the anchorage of the towing warp, to the door. Thereby the opposing drag and water reaction forces acting upon the door will produce the results desired with a door of minimum weight, indeed, a weight not much more than half that of a comparable door of conventional form and rigging.

Many trawl doors now in use are quite heavy, hence are difficult to lift, to stow and secure, and generally to handle. The weight, however, has been considered necessary as ballast to maintain the door in its correct attitude during use, and to hold it to the bottom. For example, a door may weigh one thousand pounds in air. It is an object of this invention to make a door which by maintaining stably a desired attitude against water reaction will at least equally well maintain contact with the bottom, but will weigh far less, and thereby be much easier to handle and control and also cost less. Again by way of example, a door made according to this invention and equivalent or superior in bottom holding capability to the thousand-pound door mentioned, would weigh in the neighborhood of six hundred and fifty pounds.

Mention has been made of the towing bridle for the door. Such bridles have sometimes been made of four chains or cables, each wholly flexible. The extreme flexibility of such bridles has made it difficult to control the door and to maintain its stability. To counter such tendencies bridles have sometimes been made of rigid legs. This, however, affords no flexibility, and there can be no give in the bridle upon encountering a bottom snag, so that the bridle may be damaged, or the door will deflect unduly. By the present invention, in its preferred form, the bridle is sufficiently rigid for adequate control of the door, but is at least in part flexible, to allow some given when needed. Also, the bridle is so designed that it will collapse onto the door when the latter is hauled in for securement to stanchions aboard the trawler, yet will return to proper shape when the door next goes into use.

Quite importantly, the bridle of the type just mentioned will assure that the door assumes a positive angle of attack relative to the water, when the door first hits the water during setting of the gear, and thereby the door will constantly veer outboard, and have no tendency to veer inboard nor to dart about uncontrollably, with the possibility of fouling gear at the opposite side of the net.

It is also an object to make a door in a design which is simple to make, and correspondingly inexpensive, and a design such that the port door and its components are reversible or interchangeable to constitute at will a starboard door. It is only necessary to carry spare parts for the different components, capable of fitting the door at either side of the trawler.

All such doors are ballasted to assist in maintaining them correctly oriented. It is an object of this invention to dispose the ballast in such distribution and orientation relative to the bridle and the point on the latter where the towing warp is anchored, and further in relation to the forces of water reaction upon the relatively sloped upper and lower surfaces of a V-shaped door, that the water reaction forces will tend to hold the door riding along its lower edge upon the bottom, despite heavy swells that might produce recurring surges along the towing warp tending to lift the door, and to accomplish such results with a minimum of ballast.

Still further, it is an object to locate the point of application of the towing force upon the door and of the drag force of the net behind the door, in such relation to the midpoint of its geometrical form, especially in a door of V-shape, that the several force couples acting upon the door will maintain it in a stable attitude, that is to say, tilted with its upper edge slightly behind its lower edge, its forward end always outboard of its after end, and its lower edge evenly in contact with the bottom over which it drags.

Other objects will appear later, but enough has been said to indicate the principal ends in view.

The invention comprises the novel door, both per se and in combination with a novel bridle, as is shown in a representative form in the drawings, and as will be described herein and defined in the claims.

FIGURE 1 is an isometric view of a door and bridle, in position of use.

FIGURE 2 is a transverse sectional view through the door, the view point being indicated at line 2—2 of FIGURE 3, and FIGURE 3 is a top plan view of the door.

FIGURE 4 is an exploded isometric view of the door and bridle, illustrating the several individual components.

FIGURE 5 is a partially exploded isometric view, from the side opposite the view point of FIGURE 1.

FIGURE 6 is a cross-sectional view through the marginal bead at the nose of the door.

FIGURES 7, 8 and 9 are isometric views showing succesive steps in the securement of the lazy line to the door, and FIGURE 20 is an elevation of the anchorage at the door for such a line.

FIGURE 11 is a cross-sectional view illustrating the interchangeability of door components to make either a port side or a starboard side door.

FIGURE 12 is a diagrammatic edge view, and FIGURE 13 is a side elevational diagram illustrating the correct relationship of the door and its bridle, and the effect thereof in urging the door stably against the bottom.

FIGURES 14, 15 and 16 are diagrams, being respectively a top plan view, a front elevation, and a side elevation, showing an incorrect relationship of the door and bridle, and the effect thereof under certain conditions.

FIGURES 17, 18 and 19 are similar diagrams, but showing by comparison the correct relationship according to this invention, and the effect thereof under like conditions.

The door of this invention is elongated fore and aft, of V-shape in cross section, and the apex line of the V is intended to be horizontal during use, with the door generally upright. The bottom edge drags the bottom of the sea, and is ballasted. An upper curtain line, which may be termed a sweep line, is secured to the upper rear portion of the door, at the interiorly angled posterior face. A lower sweep line is secured to the lower rear portion of the door, at the same face. These two sweep lines extend rearwardly, and transmit all the drag of the net to the door. A single towing warp extends forwardly from a bridle attached to the exteriorly angled anterior face of the door at a particular location, and of a novel construction and orientation. This towing warp transmits to the door, and hence to the net, all the pull from the trawler at the one side of the net. Another line may be attached at the door, as will appear later, but is not stressed during trawling.

The angle of attack of the door is controlled by the moments produced by the opposing forces acting at the anchorages of the towing warp and of the sweep lines respectively. The vertical disposition of the door is controlled by the location of the anchorage of the towing warp with relation to the apex line, and in relation to the upper and lower surfaces of the V-shaped door panel, aided to whatever extent may be necessary by ballast. Similar factors control maintenance of the door's lower edge in constant and full contact with the bottom. Such considerations will appear more fully hereinafter.

The door comprises, for example, a somewhat elongated metal plate or panel 1, bent along an apex line 10 that parallels and is about midway between its upper and lower edges, to define an upper portion 11 and a lower portion 12 of equal area and symmetrically disposed relative to the apex line. The angle at the apex line is not great, yet the door has the cross-sectional shape of a shallow V. Its forward end or nose may be rounded, and its rear end straight, except for the V-shape as viewed end on. To protect its edges and to reinforce the door generally, and to avoid chafing the vessel or lines or net mesh that might contact its edges, a marginal bead is applied. This includes the ballast element 2 along its lower edge, the similarly shaped but much lighter hollow buoyancy tube 20 along its upper edge, a forward edge or nose portion 21, also of light material or design, and a light rear edge portion 22. All these, and especially the members 2 and 20, are preferably removably secured in place, as by the bolts 23.

The bridle is three-legged, and the relationship of its legs to one another, and of all relative to the panel 1, are important. Normally one leg 3 is forward, and its inner end is secured at 30 to the door along the apex line 10, and somewhat ahead of the midpoint M (see FIGURES 13 to 19) of that line. The other two legs, the upper leg 31 and the lower leg 32, are normally rear legs, and are secured to the door panel 1 at 33 and 34 respectively, adjacent the upper rear and lower rear corners of the panel, well behind the midpoint M. One of the three legs should be rigid, for better control of the bridle as a whole, and the others are flexible. The forward leg 3 is preferably the rigid one, and the legs 31 and 32 are flexible, being, for example, of wire cable encased in rubber, as shown in FIGURE 3. The securement at 30, as indeed also at 33 and 34, allows sufficient universal pivotal movement that the leg 3 can assume any necessary angle relative to the panel 1 and its apex line 10, in use.

The outer ends of the legs 3, 31, and 32 are joined by a common securing means, at 35. The relative lengths of the several legs, and the location of the points of securement of their outer ends to the panel, will determine the location of this securing means 35 relative to the panel, and the effect on the panel of the force applied by the towing warp W, also secured at 35, to tilt it and thereby produce differential water reaction forces upon its upper and lower portions, to hold it more securely upon the bottom. The single (forward) leg 3 is rather short, and extends rearwardly from its securement at 30 to the panel to the common securing means at 35. The legs 31 and 32 are appreciably longer, and either they are of slightly different lengths, or if of equal length are secured to the panel 1 at points such that the securement at 33 is displaced somewhat ahead of the securement at 34 or, alternately, nearer the apex line 10 than 34. The result of these relative effective lengths is to displace the common point of securement at 35 below the extension of a plane bisecting the V of the panel. The relation of the several legs is such that the common securing means 35 is always ahead of the midpoint M during trawling; see for example FIGURES 17 and 19.

It will be understood that a drag force applied at the thus displaced point of securement 35 (see FIGURE 13), opposed by water reaction forces on the door (regardless of the door's shape), will produce a moment about the lower edge of the door which will tend to incline it rearwardly about the lower edge. When the door has tilted so far that the moment about the connection at 33 plus water reaction on the portion of panel 1 equals the moments of legs 32 and 3 and water reaction on the lower portion of the panel 1, tilting or inclination of the door ceases. An assumed initial and fully upright position of the door is shown in dash lines in FIGURE 12, and the full line position represents its stable tilted position. Water acting against the so-tilted V-door produces a force component on the upper portion and acting downwardly much greater than any upward force component acting upon the more nearly upright lower portion. The resultant of these downward and upward forces is a strong force acting to hold the door's lower edge to the bottom. In this manner a light door, with all its advantages of lower cost, easy handling, etc., can hold to the bottom as well as, or better than, a much heavier door.

The value of the downward force varies in direct ratio to the forward speed of the trawler. In heavy weather the trawler moves slowly up a swell, and slides rapidly down its opposite slope. This produces fluctuations in its speed, which are communicated through the towing warp to the door. Whereas in prior doors such forward surges tended to lift the door off the bottom, unless it was heavily ballasted, the increased forward speed during each surge only produces a larger downward force on the door, in the manner already explained, and so the door tends even more strongly to remain on the bottom. In other words, whenever a greater downward force is required it is produced by the increased water reaction forces resulting from the condition that requires the greater downward force, and only a minimum of ballast is required.

Another result of the bridle arrangement of this invention is to keep the door apex line 10 horizontal as the door is towed during trawling. With the scope used in efficient trawling (that is, the amount of towing warp payed out for the depth fished), doors bridled conventionally ride along the bottom with the leading end of the runner shoe off the bottom, as shown in FIGURES 14, 15 and 16, since the attachment 35 of the upwardly leading warp W is well forward in relation to the door and produces an appreciable upward moment. This raised leading end condition is not serious in a flat single plane door except that the runner shoe wears on its trailing end only and must be repaired or replaced much more frequently than would be the case if the shoe wore evenly along its entire length. However, in a V-type or dihedral door this raised leading end attitude causes the door to have an upwardly directed component of water reaction, as can be ascertained by studying FIGURES 14, 15 and 16—and as before, it also varies in direct ratio with the speed of towing. This tends to nullify part of the effective weight of the door. To remedy this serious defect the attachment 35, and in the preferred form the bridle as a whole, is moved back longitudinally on the door to a point where the door is sufficiently in gravitational and moment arm balance that the apex line 10 of the door is maintained horizontal even though the towing warp leads upwardly. With equal distribution of ballast along the runner this point is longitudinally near the midpoint M of the apex line, but the exact placement is not critical, provided the point 35 is always ahead of the midpoint M, in use, as shown in FIGURE 19, as some displacement ahead of or behind the precise point of balance will nevertheless result in satisfactory performance, with the runner bearing on its full length on the bottom B. The forward location of point 35 relative to midpoint M maintains the outboard inclination of the door relative to its direction of advance.

The door panel 1 may be a plate of aluminum. The bead elements 20, 21, 22 may be of aluminum, and the ballast bead 2 of steel. If additional ballast is required, for instance to replace wear on the element 2, one or more steel bars 4 may be applied by the bolts 23, as in FIGURE 5. The nose piece 21 may be lightened, as by the lightening holes or sockets 25—see FIGURES 5 and 6—to desirably help lower the center of gravity of the door. However the door can be made of steel entirely and galvanized for corrosion resistance, with excellent functional and maintenance results.

Various eyes are located upon the faces of the panel 1 for securement of the legs, the sweep lines, and a lazy line. Thus simple eyes at 30, 34 for legs 3 and 32, and eye 13 near the midpoint of the apex line for hoisting and securing the door, and 14 and 15 for the sweep lines S at the opposite face of the door, will be provided. Double eyes 16 are also useful in securing. The eye at 33 where the leg 31 is secured, or another eye in this vicinity, is of a special form for engagement by the G-hook at the forward end of the lazy line L to prevent accidental disengagement of the G-hook 7 while making its intentional disengagement simple. This eye at 33 (see FIGURES 7 to 9) has grooves 33' allowing entrance of the closely spaced jaws of the G-hook 7 by movement in one direction, as in FIGURE 7, but before the G-hook can engage in the aperture 71 its jaws must be moved in a direction at right angles, as in FIGURE 8, to its initial movement, through the grooves 33''. Its final engaged position is shown in FIGURE 9. This lazy line is used only during hauling of the net, and not during trawling, but its forward end must be accessible and releasable when the door has been hauled aboard the trawler and secured.

The door and its fittings can be used either for a portside door or for a starboard side door. FIGURE 11 indicates this capability. The panel 1, minus fittings and marginal elements, can be used with either horizontal edge uppermost. Since the door is symmetrical at opposite sides of its apex line 10 the ballast 2 will fit either such edge, and the like hollow bead 20 the opposite edge. The nose bead 21 fits the nose portion, whichever horizontal edge is uppermost, and the rear bead fitting 22 similarly fits the rear edge. The eyes can be removed readily, and an eye such as that at 33 which should be near the upper edge is merely interchanged with the eye at 34. All other eyes except 16 (which is merely moved to the opposite edge) can remain in place. This arrangement makes it unnecessary for the trawler to carry separate port and starboard doors, to replace one that may be damaged or lost. Parts for one door will make up either door that may be damaged in part or lost on a snag. Previous doors were largely custom built and welded together, and when one was worn or damaged it had to be delivered (with all its bulk and weight) to a fabricator for repairs, and this usually entailed lost fishing time and a high repair bill. Now with this invention the trawler operator merely carries interchangeable spare parts and efficiently and economically makes repairs himself, while in fishing waters, with virtually no lost fishing time.

I claim as my invention:

1. A trawl door comprising a panel V-shaped in cross-section, and intended for disposition generally uprightly in use, with the apex line of the V horizontal, a bridle for dragging said door including a single forward leg secured to the panel ahead of the midpoint of but substantially in the apex line, a pair of rear legs secured to the panel rearwardly of the midpoint of the apex line, one above and one below such line, and means joining the outer ends of said three legs, the two rear legs being of generally equal length, exceeding the length of the forward leg by sufficient to incline the forward leg rearwardly and outwardly from its securement to the panel, and to locate the joining means for the three legs outwardly of but approximately in a line extended through the midpoint of and perpendicular to the apex line.

2. A trawl door as in claim 1, wherein the forward leg is rigid.

3. A trawl door as in claim 1, wherein the forward leg is secured to the panel at a point in the apex line spaced ahead of the midpoint of such line by a distance materially less than the spacing of the points of securement of the rear legs behind such midpoint.

4. A trawl door as in claim 1, wherein the rear legs are flexible.

5. A trawl door as in claim 1, wherein the forward leg is inclined downwardly, as well as rearwardly and outwardly, with respect to the panel, to dispose its outer end and the joining means for the three legs somewhat below the extension of a plane bisecting the V of the panel.

6. A trawl door as in claim 5, wherein the rear legs are secured to the panel adjacent the rear end thereof, in a line substantially perpendicular to the plane bisecting the V of the panel, and the lower rear leg is enough shorter than the upper rear leg that all three legs join at the joining means, located below the extension of such bisecting plane.

7. A trawl door as in claim 1, wherein the joining means is located in the vicinity of a line bisecting the V of the panel and extending through the midpoint of the apex line.

8. A trawl door comprising a panel V-shaped in cross-section, and intended for disposition generally uprightly in use, with the apex line of the V horizontal, a forward leg secured to the panel substantially in the apex line and nearer to the midpoint thereof than to the panel's forward end, a pair of longer rear legs secured to the panel at points adjacent the upper and lower edges thereof, and both near its rear end, and means joining the outer ends of the three legs at a common point located slightly below the extension of a plane bisecting the V of the panel, and in the vicinity of a line lying in such bisecting plane, perpendicular to the apex line and extended through the midpoint thereof, the respective legs being each of such length as to meet at such common point.

9. A trawl door as in claim 8, and ballast means upon the lower half of the panel.

10. A trawl door as in claim 8, and ballast means distributed along the lower edge of the panel, both ahead of and behind the joining means, to displace the panel's center of gravity below the midpoint of the apex line.

11. A trawl door as in claim 8, wherein the forward leg is rigid, but is secured to the panel for pivoting relative to the latter, and the rear legs are flexible.

12. A trawl door as in claim 8, wherein the forward leg is the shortest, the upper rear leg the longest, and the lower rear leg is somewhat shorter than the upper rear leg.

13. A trawl door comprising a metal plate of V-shape in cross-section, and intended for disposition generally uprightly in use, with the apex line of the V horizontal, a three-legged bridle for dragging said door including a forward leg and upper and lower rearward legs, an eye as an anchorage for the inner end of the forward leg secured to the V-plate at its exterior angle, somewhat ahead of the midpoint of the apex line, an eye as an anchorage for the inner end of the upper rear leg located at the same face of the V-plate, adjacent its upper and rear edges, another eye as an anchorage for the inner end of the lower rear leg also located at the same face of the V-plate, but adjacent its lower and rear edges, a means common to all the legs for joining their outer ends, the effective lengths of the several legs being such that the joining means is located in the vicinity of a line extended through the midpoint of the apex line and perpendicular thereto, and bisecting the V of the plate, but somewhat below such line, and ballast means distributed along the lower edge of the plate to displace the door's center of gravity below such line and below the joining means.

14. A trawl door as in claim 13, including a sectional marginal bead about the edges of the plate, the ballast means constituting the lower edge portion thereof, a corresponding upper edge portion, and forward and rear edge portions, and means removably securing said individual portions to the edges of the plate, the upper and lower edge portions being interchangeably shaped, and the forward and rear edge portions being each reversibly shaped, top for bottom.

15. A trawl door comprising a plate V-shaped in cross-section, and intended for disposition generally uprightly in use, with the apex line of the V horizontal, a bridle for dragging said door having three legs in triangular disposition at the exterior angle of the plate, means upon the apex line and displaced longitudinally from the midpoint of that line for securement of the inner end of one leg, two means, one above and one below that line, and displaced longitudinally from the midpoint but at the end opposite the midpoint from the securement means for the first leg, said two means engaging the inner ends of the two other legs, respectively, and means engaging the outer ends of all three legs, and constituting an anchorage for a towing warp, the effective lengths of the several legs being such that said anchorage is located in the vicinity of a line extended through the midpoint and bisecting the V, and perpendicular to the apex line.

16. A trawl door comprising a panel V-shaped in cross-section, intended to be disposed uprightly in use, with its apex line horizontal, and formed with a rounded nose, a marginal bead extending about the edges of the panel and including a lower ballast member and an upper edge member, of like size and shape, and means for removably securing the ballast member to the lower edge of the panel and the upper edge member to the panel's upper edge, or by reversal of the panel top for bottom to secure said members to the opposite but now inverted edges of the panel.

References Cited in the file of this patent

UNITED STATES PATENTS

| | | |
|---|---|---|
| 2,816,385 | Luketa | Dec. 17, 1957 |
| 2,942,371 | Johnson et al. | June 28, 1960 |

FOREIGN PATENTS

| | | |
|---|---|---|
| 37,282 | Norway | July 2, 1923 |
| 819,018 | Germany | Oct. 29, 1951 |